March 13, 1962 P. H. BRONNENKANT ET AL 3,024,498
HIGH VELOCITY INJECTION MOLDING OF THERMOPLASTICS
Filed March 3, 1958 3 Sheets-Sheet 1
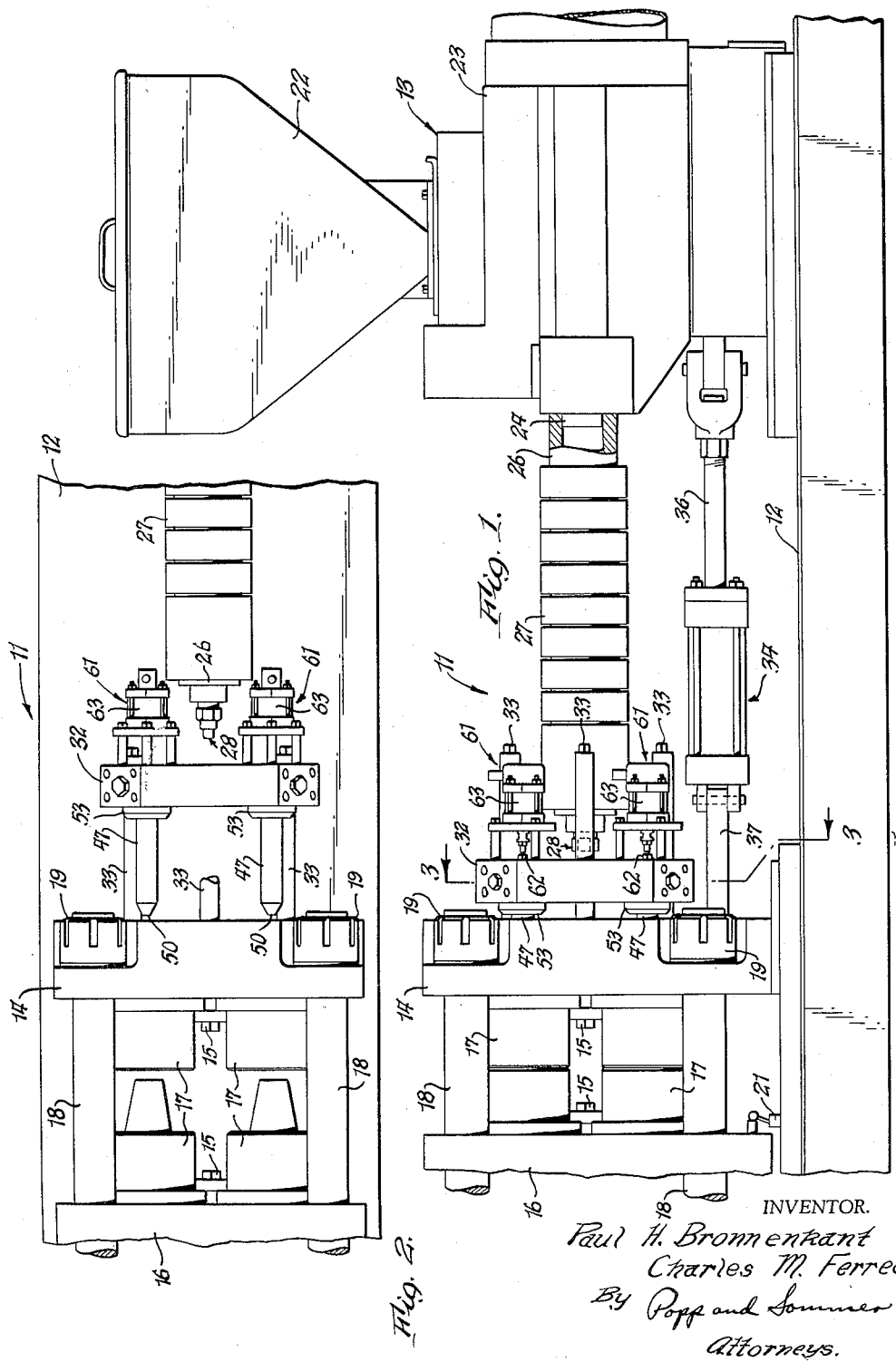
INVENTOR.
Paul H. Bronnenkant
Charles M. Ferree
By Popp and Sommer
Attorneys.

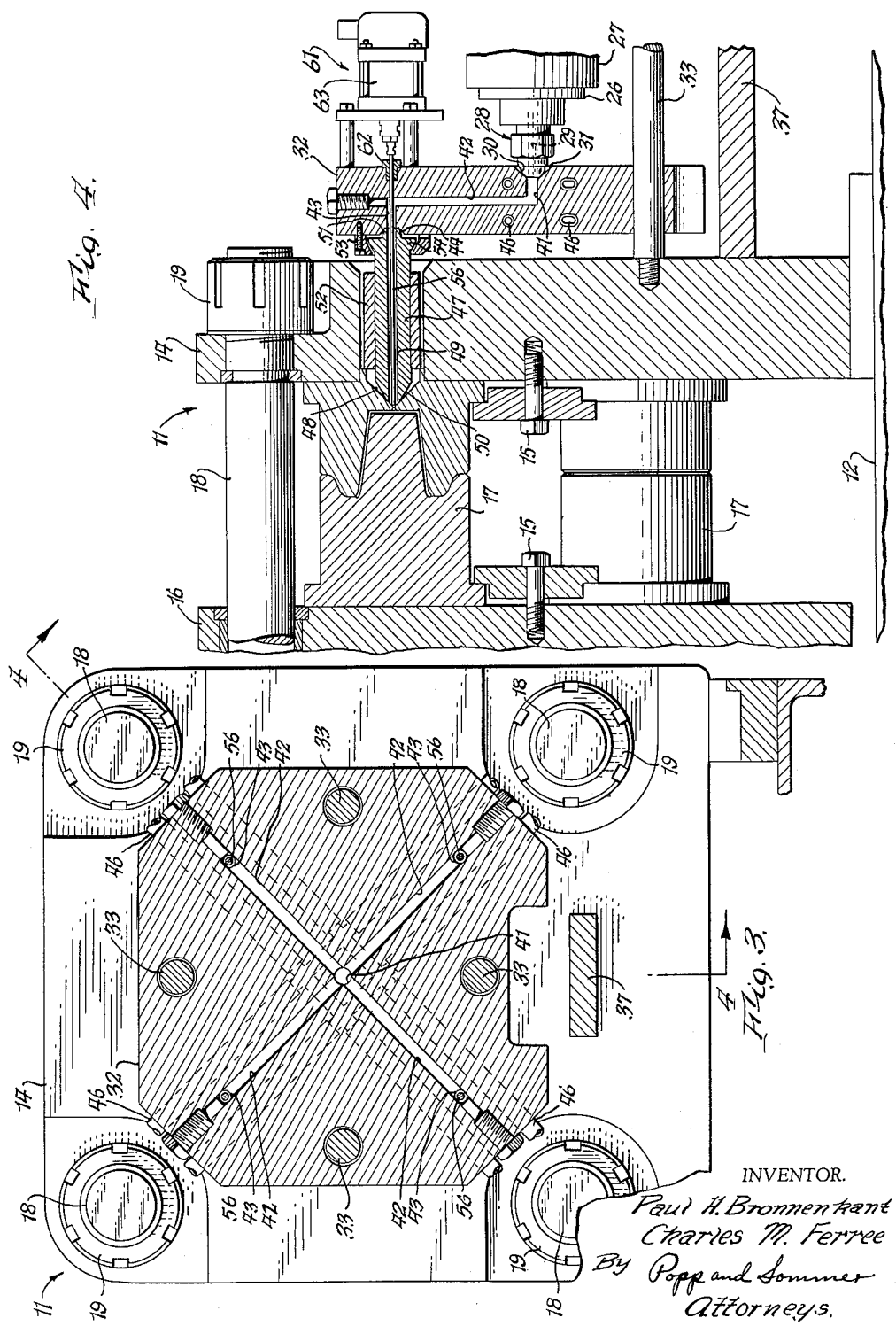

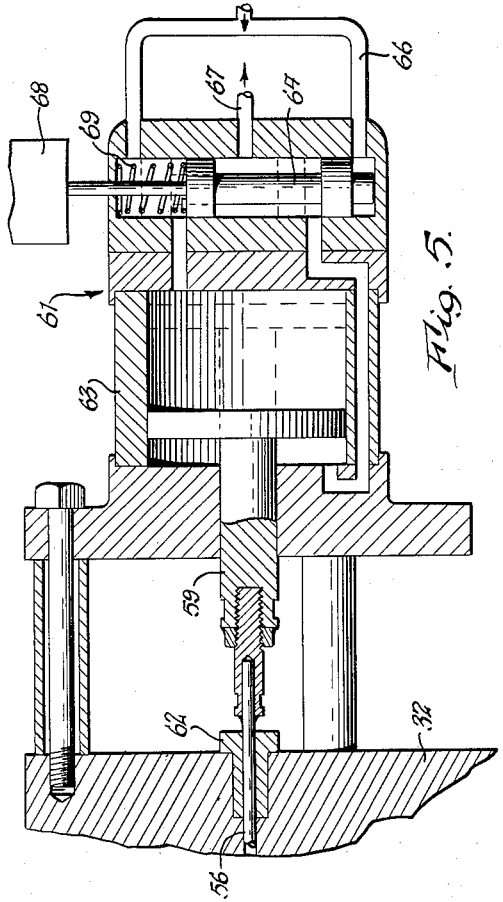
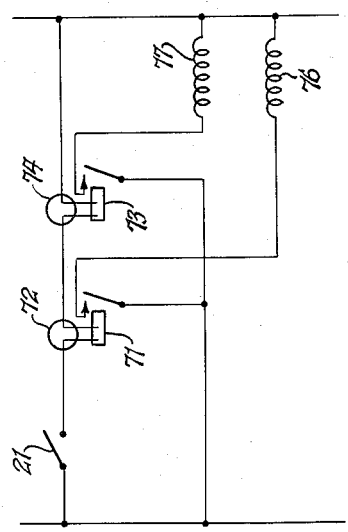
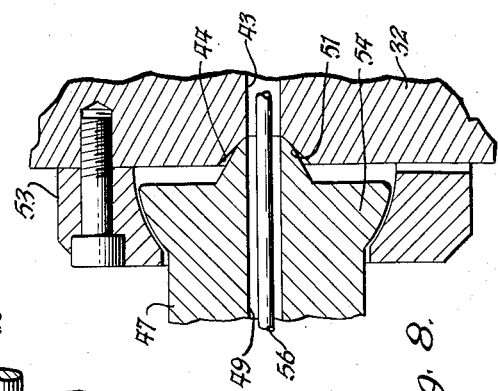
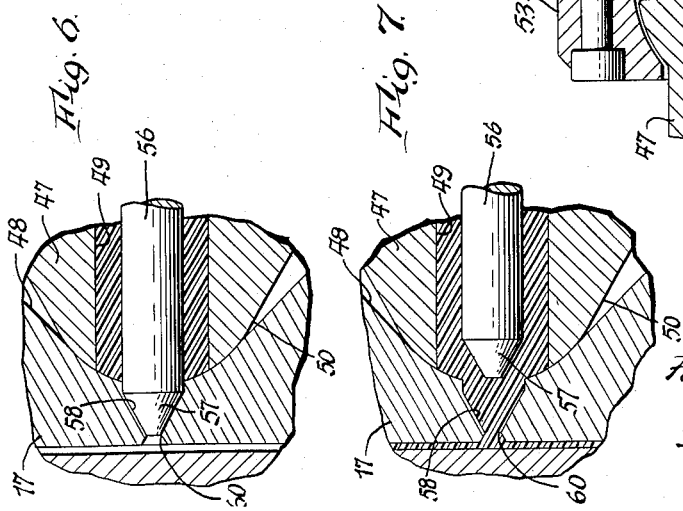
INVENTOR.
Paul H. Bronnenkant
Charles M. Ferree
By Popp and Sommer
Attorneys.

United States Patent Office 3,024,498
Patented Mar. 13, 1962

3,024,498
HIGH VELOCITY INJECTION MOLDING OF THERMOPLASTICS
Paul H. Bronnenkant, 803 Hopkins Road, Williamsville, N.Y., and Charles M. Ferree, R.F.D. 6, Lockport, N.Y.
Filed Mar. 3, 1958, Ser. No. 718,807
6 Claims. (Cl. 18—30)

This invention relates to high velocity injection molding of thermoplastics induced by a controlled pulse of precompressed fluidized thermoplastic material, and more particularly to a machine for such molding wherein certain new and novel structural features are provided which result in an improvement over known similar molding machines.

In our copending application, Serial No. 590,030, filed June 7, 1956, we disclosed a method and machine for molding thermoplastic materials by use of high velocity injections resulting from the compression of the material and the sudden release thereof into a mold after a predetermined pressure is developed. This method is extremely effective in producing objects having thin wall sections of appreciable area, and in molding difficult shapes and various shapes which were impossible to make by methods and machines known prior thereto.

Briefly, such technique involves keeping the entry orifice to the mold closed by some controllable means while pressure is applied to the plastic material in the injection or compression cylinder by means of an injection plunger or ram. Thus contained, the plastic material is momentarily compressed to the extent of increasing density and diminishing volume, resulting in the storage of a tremendous expansive force. The pressure developed in the plastic material may be in the order of 30,000 pounds per square inch. When the entry orifice to the mold is opened, this expansive force, within the material itself, causes it to pass through the entry orifice into the mold with an extremely high velocity.

The machine of the present invention may be used for substantially practicing the molding method disclosed in our copending application, however, it differs from the machine thereof in certain structural details which provide various unique advantages. More particularly, the machine of the present invention includes a mechanically operated flow control rod that is operated in timed sequence with the stroke of the material compressing piston. Such a flow control rod affords more precise material flow regulation, since among other things, the inertia factor is substantially reduced thus making for greater sensitivity and requiring less power for operation. The more precise material flow control provided by the machine of the invention, avoids packing or compressing of the material in the mold in the region of the entry orifice, thus eliminating internal strains, as well as dimensional discrepancies in the solidified molded part. In addition, the use of individually operated flow control rods in a multiple die or mold machine, allows greater flexibility of use, since objects differing in size or shape may be produced in the same operating cycle. Further, the use of high pressure contact areas at the ends of removable nozzle elements, eliminates or reduces escape of pressurized material. Also the ease in which the machine mold and material injecting system may be disassembled, reduces the downtime required for cleaning or repair operations.

The main object of this invention is to provide a high velocity injection molding machine for the production of thermoplastic articles.

A further object is to provide a high velocity injection molding machine wherein a thermoplastic material is compressed a predetermined degree before being admitted into a mold cavity.

A further object is to provide such a high velocity injection molding machine in which all operable and movable mechanism to compress and control the flow of the plastic material is made as a part of the injection molding machine, rather than being incorporated into the mold or die. This provides economy of mold construction, as well as retaining the versatility of operation, wherein molds for a variety of items may be readily interchanged and operated in the same machine.

Another object is to provide such a machine which permits the mold therewith to be designed so as to abolish all passages within the mold itself thereby eliminating the possibility of entrapping any residue of solidified plastic material in the mold.

Another object is to provide such a machine in which no residue of solidified plastic material or "cold slug" will be left in the vicinity of the entry orifice to the mold from a previous injection, thereby eliminating a deterrent to the high velocity filling of the mold during the subsequent injection cycle. For practical reasons with regard to pressure retention, as well as for reasons of appearance on the molded part, the entry orifice to the mold should be relatively small in size.

Another object is to provide a machine in which the entry orifice to the mold is opened and closed while the plastic material is under high pressure.

Another object is to provide a machine in which flow of plastic material through the entry orifice into the mold is limited in amount to that required to fill the mold. This is particularly important since filling a mold with high velocity plastic involves such factors as the momentum produced by the high velocity, an excess of expansive force remaining within the plastic material in the injection cylinder and the follow-up force continuing to be applied by the injection plunger, all of which tends to pack or compress the material in the mold closest to the entry orifice. This condition results in the presence of internal strains as well as dimensional discrepancies in the solidified molded part.

A more specific object is to provide a high velocity injection molding machine affording precise material flow regulation resulting in elimination of packing or compressing of the material in the region of the mold entry orifice.

Another object is to provide such a machine in which flow of the plastic is controlled by a movable rod of small cross section arranged in a passage of comparatively large cross section, thereby eliminating restrictions and the likelihood of entrapping solidified plastic material.

Another object is to provide such a machine which will actuate such flow control rod not only to open the entry orifice to the mold at a predetermined time but, by infinitely adjustable timing means, to close the orifice with the rod, simultaneously with the filling of the mold, to prevent packing of additional plastic material in the vicinity of the entry orifice.

Another object is to provide such a machine which can be rapidly and easily flushed or cleaned of foreign particles which may be introduced into and become entrapped in the plastic material and which might cause a stoppage at the entry orifice to the mold, thus reducing down-time prior to the resumption of production.

Another object is to provide such a machine in which the means for controlling the flow of fluidized thermoplastic material is so arranged that build-up and confinement of pressure on the material is mechanically impossible until such time as the apparatus is in proper association with the mold or molds, thereby eliminating hazard to attendant personnel by preventing highly pressurized emission except into the mold.

Still another object is to provide a high velocity injection molding machine affording greater flexibility of use since objects differing in size or shape may be produced in the same operating cycle.

Another object is to provide a high velocity injection molding machine wherein the escape of pressurized thermoplastic material is eliminated or substantially reduced.

These and further objects and features of the invention will become more apparent from the following description and accompanying drawing wherein:

FIG. 1 is an elevation view of a part of a molding machine embodying the principles of the invention;

FIG. 2 is a partial plan view of the same but showing certain parts axially displaced relative to each other;

FIG. 3 is an enlarged section view as seen from line 3—3 in FIG. 1;

FIG. 4 is a section view as seen from line 4—4 in FIG. 3;

FIG. 5 is a section view of an illustrative operative means for a flow control rod used in the machine of FIG. 1;

FIG. 6 is an enlarged section view of the region at the end of a flow control rod showing the rod in seated position;

FIG. 7 is the same as FIG. 6 but showing the end of the rod in unseated position;

FIG. 8 is an enlarged section view of the region at one end of an injection nozzle; and FIG. 9 is a wiring diagram illustrating an electrical circuit used in the machine of FIG. 1.

Referring now to the drawings, the numeral 11 identifies a molding machine embodying the principles of the invention which includes a frame or bed 12 on which a hopper assembly 13 is slidably mounted for horizontal movement, a stationary platen 14, and a horizontally movable platen 16. A plurality of split molds 17, four being shown, are provided with one-half of each thereof being removably affixed by bolt clamping means 15 to the stationary platen 14, and the other half being removably affixed by bolt clamping means 15 to the movable platen 16. Conventional cooling means, such as water carrying passages (not shown) may be incorporated in the mold 17. The movable platen 16 is arranged for sliding movement upon parallel horizontally arranged tie rods 18, one end of each being affixed to the stationary platen 14 by nuts 19, the other end being secured to a rigid member (not shown) of the machine. Conventional means are provided to cause movement of the platen 16 toward and away from the stationary platen 14, whereby the molds 17 may be closed in readiness for a molding operation, and opened for removal of the molded article. Closing movement of the movable platen 16 causes the closing of an electric switch 21, to initiate a molding operation, as will be explained in greater detail hereinafter.

The hopper assembly 13 includes a conical bottomed bin or hopper 22, arranged to receive a supply of thermoplastic material in granular or pellet form and feed it into a cylinder 23 in which is slidably arranged a piston or ram 24. Power means (not shown) of the hydraulic type, are arranged to cause movement of the piston 24 so that a given amount of material from the hopper 22, is moved into an injection or compression cylinder 26 horizontally arranged. The material is heated in the cylinder 26 by electrical coils 27 of conventional design arranged about the periphery thereof, so that it is fluidized, following which it is compressed to an extent whereby an actual reduction in volume thereof occurs. With the high molecular weight polymeric thermoplastic resins preferably used in the machine of the invention, a reduction of more than 10 percent is obtainable before the incompressible limit of the material is reached. The extreme pressure thus generated, which may be in the order of 30,000 pounds per square inch, results in high velocity injection when the material is admitted to the mold, so that the mold cavity is completely filled even with molds having closely spaced molding surfaces to provide very thin regions of appreciable area, as used in the molding of water tumblers for example.

The forward end of the cylinder 26 is provided with a nozzle 28, having an axially arranged bore or orifice 29 and a rounded conical nose 30 that is adapted for seated engagement in a countersunk recess 31 (FIG. 4) formed on the rear side of an injection head 32. This injection head is shown as being in the form of an upright generally rectangular metal block slidably supported upon a plurality of guide rods 33, four being shown, affixed at one end to the stationary platen 14. It will be seen that the area of contact between the conical nose 29 and the countersunk recess 31 is small, thus affording an extremely high contact pressure to be generated by a force pulling the nozzle 28 toward the injection head 32. Such a force is generated by a cylinder 34 and piston 36, slidably arranged therein, which cylinder and piston are operatively positioned between the stationary platen 14 and slidable hopper assembly 13, the end of the cylinder being supported and pivotally affixed to the stationary platen by a bar 37, while the end of the piston 36 is pivotally affixed at the lower part of the hopper assembly, as seen in FIG. 2. A source of pressure fluid is connected to the cylinder 34 in a manner as to produce a pulling effort on the hopper assembly 13 whereby the nose of the nozzle 28 will be urged into tight engagement with the recess 31.

The injection head 32 is formed to provide an axially disposed passageway 41 which leads from the recess 31, and connects with a plurality of radially directed passageways 42, four being shown, each of which connects near its outer end with an axially disposed passageway 43 which enters a conical recess 44 formed in the forward side surface of the injection head 32. Thus the material can flow from the cylinder 26, through the nozzle 28 and from recess 31 to recesses 44 via the passageways 41, 42 and 43. Heater elements 46 of conventional design are disposed in the injection head 32 adjacent the passageways 42, to maintain the plastic material therein at a temperature above the melting point.

Projecting forwardly and normal to the injection head 32, are a plurality of injecting nozzles 47, one for each passageway 43. Each of the nozzles 47 passes through an enlarged opening provided in the stationary platen 14, and is seated at its rear end in the corresponding one of the conical recesses 44, on the injection head 32, and seated at its front end in a conical recess 48 formed in the opposing base of the corresponding split mold 17. An axial bore or passageway 49 extends through each nozzle 47 and communicates with the corresponding passageway 43 in the injection head 32.

As best seen in FIGS. 6 to 8, the forward end of a nozzle 47 has a rounded conical nose 50 while the rear end has a rounded conical nose 51, each of the noses 50 and 51 forming a small area of contact with the engaged recesses, whereby extremely high contact pressures may be developed by the force acting axially upon the nozzles 47. In such manner, the highly pressurized plastic material contained within the nozzle during machine operation, will be prevented from leaking through the joint at each end of the nozzle. A heater element 52 surrounds each nozzle 47 to maintain the material therein at a temperature above the melting point.

A further advantage of this type of engagement between opposite ends of the injecting nozzles 47 and the mold 17 and injection head, is that it will accommodate for dimensional changes due to thermal expansion of the parts.

A cap or bonnet 53 removably affixed to the injection head 32 surrounds a head 54 formed on the rear end of each nozzle 47, to loosely hold the nozzles on the injection head when the axial force thereupon is released, as during servicing of the machine. Extending through the bore 49 of each nozzle 47 and passing through the injection head 32, is a flow control rod 56, one end of which has a tapered end 57 adapted to seat in a conical valve seat 58 formed in the center of the recess 48, while the other end is threadably connected to a piston 59 forming part of an actuating mechanism 61 secured to the side of the injection head 32. The seat 58 is connected to the mold cavity by an orifice 60. The rod 56, which is of smaller diameter than the diameters of nozzle bore 49 and passageway 43, is slidably arranged in a bushing 62 threadably secured to the injection head 32, and in such manner as to prevent leakage of pressurized plastic material from passageway 42 of the injection head.

The actuating mechanism 61 includes a cylinder 63 arranged for reciprocating action of the piston 59, a slide valve 64 adapted for admitting pressure fluid, say compressed air from a supply pipe 66, to one side of the piston and simultaneously venting the opposite side of the piston to an exhaust pipe 67, and a solenoid 68 affixed to one end of the valve 64. A spring 69 is compressively arranged to normally urge the valve 64 toward one position as shown in FIG. 5, said spring being further compressed by action of the solenoid 68 when it is energized to cause shifting of the valve. It will be seen that in non-operative position of the solenoid 68, the valve 64 will cause pressure fluid from supply pipe 66 to maintain the piston 59 toward the mold 17, while when the solenoid 68 is energized it will shift the valve 64 to reverse the pressure differential acting upon the piston and cause movement thereof away from the mold 17.

The operation of the actuating device 61 to unseat the end of the rod 56 from the seat 58, is coordinated with the compression movement of the ram 24, so that the compressed plastic material is admitted to the mold cavity only after it has been pressurized a predetermined amount. For example, if the movement of the ram 24 from beginning to end of stroke, takes one second, then the actuating mechanism may be operated so that one or more rods 56 will be unseated for the last one-fifth second of the ram movement.

An electrical circuit for producing the desired operational sequence is illustrated in FIG. 9. A series circuit is arranged from the switch 21 so as to include a solenoid 71 of a timer mechanism 72, and a solenoid 73 of a timer mechanism 74. Energization of the solenoid 71 completes a circuit through the armature thereof, and through a coil 76 of a solenoid (not shown) which operates a valve to initiate application of power to the ram 24 to cause a compressing movement thereof, while energization of the solenoid 73 completes a circuit through the armature thereof through a coil 77 of each solenoid 68 of the actuating mechanisms 61. The timer mechanism 72 may be set to provide a variety of ram operating times, while the timer mechanism 74 is of the proportional type and may be set to operate for any proportional terminal portion of the operating period of timer mechanism 72. Obviously, the timer mechanisms 72 and 74 provide a means for regulating the volume and pressure of the thermoplastic material being injected into a mold.

When the machine is operating, the piston and cylinder device 34 forces the injection cylinder nozzle 28 forwardly against the injection head 32 which in turn forces the various injecting nozzles 47 connected thereto forwardly against the bases of the various molds 17. Assuming the molds to be open as shown in FIG. 2 at the beginning of a molding cycle, the first thing which occurs is that the mold is closed by the movement of the movable platen 16 toward the stationary platen 14. As the mold closes completely, the switch 21 is energized, in turn energizing the timer mechanisms 72 and 74. Fluidized thermoplastic material within the injection cylinder 26 is compressed by the advance of the ram 24 therein. The extent to which the fluidized plastic material is compressed is determined by the setting of the timer mechanism 72 as well as the setting of the timer mechanism 74. Since the latter is adjusted for some terminal portion of the time setting of the timer mechanism 72, it will be seen that the confined fluidized plastic material is compressed to a given degree following which the flow control rods 56 are retracted to permit the discharge of a portion of such pressurized material which flows at high velocity into the mold cavities through the various entrance orifices. In the circuitry shown the flow control rods close or reseat against the bases of the molds at the time when forward motion of the ram 24 terminates, effected by the timer mechanism 72 timing out. De-energizing the ram solenoid coil 76 causes retraction of the ram 24, following which the movable platen 16 is caused to retract in a well known manner so as to open the split molds 17 for ejection of the molded parts formed therein.

A timer mechanism 74 may be associated with each actuating device 61 or may service all such devices depending upon the manner in which it is desired to operate the molding machine, that is, whether the molds 17 are filled concurrently or successively and whether the molds produce the same or different articles.

If it is desired to service the plastic supply means, as for cleaning the same of foreign particles entrapped within the plastic material, the piston and cylinder device 34 is operated so as to retract the hopper assembly 13. This retracts the injection cylinder 26. The injection head 32 and the various injecting nozzles 47 mounted thereon can then be slid rearwardly on the supporting guide rods 33 so as to break contact between the forward ends of the injecting nozzles 47 and their seats on the bases of the molds. When in such retracted condition, as shown in FIG. 2, the various parts of the plastic supply mechanism can be serviced. If cleaning of the various flow passages for plastic material is desired, this can be readily effected by operating the machine so as to move the ram 24 forwardly when the injection nozzle 28 abuts the injection head 32, thereby causing displacement of plastic material. This will purge the passages of any undesired plastic material. In order to put the machine back into operation, it is merely necessary to operate the piston and cylinder device 34 so as to force the hopper assembly forwardly. This causes the injection cylinder nozzle 28 to abut the injection head 32, in turn abutting the injecting nozzles 47 and forcing them forwardly against the immovable parts of the molds 17 attached to the stationary platen 14.

It will be seen that to mold articles of different shape, the only change in the machine required is changing the molds 17 and possibly adjusting the timer mechanism 74. Accordingly, the molding machine is very flexible in its adaptability to vary molding conditions.

It will also be seen that the construction of the molding machine is such as to provide a high degree of cleanability of those members which have plastic conducting passages.

From the foregoing it is evident that the machine of the invention may be used for high velocity injection molding, wherein the instantly operable injecting nozzle rods afford very precise material flow control so that a mold will be completely filled with the proper amount of material, thus avoiding packing in the region of the entry orifice. The arrangement of the injection nozzles, whereby they may be easily and quickly disassembled, reduces to a minimum the downtime required for cleaning or repairing operations. While the machine shown and described incorporates a multiplicity of individual molds, it will be obvious that the principles of the invention may be applied equally well in a machine having a single cavity mold, as well as one having a mold with a multiplicity of cavities.

The foregoing description has been given in detail without thought of limitation since the inventive principles involved are capable of assuming other physical embodiments without departing from the spirit of the invention and the scope of the appended claims.

What is claimed is:

1. In an injection molding machine for thermoplastic materials, the combination comprising a mold having a molding cavity and an entrance orifice thereto, an axially facing surface on said mold and surrounding said orifice immediately adjacent said cavity, and means independent of and movable relative to said mold for injecting fluidized thermoplastic material into said cavity, said means comprising a nozzle engaging said mold around said surface and having a passage aligned with said orifice, a movable closure member arranged in said passage and abuttingly seated on said surface to prevent communication between said orifice and passage, said closure member being at all times spaced from the surrounding wall of said nozzle at the discharge end thereof to provide an annular clearance therebetween, means for compressing said material to a condition of increased density and reduced volume in said passage while said closure member is seated, means for unseating said closure member after said material has been so compressed a given degree whereby a portion of said material flows with high velocity through said orifice into said cavity, and means for reseating said closure member on said surface after a predetermined amount of said material has been discharged into said cavity.

2. In an injection molding machine for thermoplastic materials, the combination comprising a mold having a molding cavity and an entrance orifice leading into said molding cavity, and means independent of and movable relative to said mold for injecting fluidized thermoplastic material into said cavity, said means comprising an injection nozzle having a first passageway aligned with said orifice and being positionable in abutting relation to said mold, a flow control rod arranged in said first passageway, said rod being of smaller diameter than said first passageway, said rod being adapted to seat against the end of said orifice to prevent communication between said first passageway and orifice, an injection head slidably supported for rectilinear movement relative to said mold and engaging the other end of said nozzle, said injection nozzle being at all times carried by said injection head, said rod extending through said injection head, a cylinder having a ram slidable therein and adapted to compress said material to a condition of increased density and reduced volume, said injection head being formed to provide a second passageway extending from one side to the other, one end of said second passageway communicating with said first passageway, said cylinder having a nozzle adapted for alignment with the other end of said second passageway whereby the material being compressed in said cylinder will flow into said injection nozzle, and a rod actuating means adapted to unseat said rod from said orifice after the plastic material is compressed a given amount.

3. In an injection molding machine according to claim 2, wherein said rod actuating means is adapted to operate for a predetermined terminal portion of the ram compression movement.

4. In an injection molding machine for thermoplastic materials, the combination comprising a stationary platen, a split mold arranged on one side of said platen and having an entrance orifice, an injection head arranged on the other side of said platen and slidably supported for movement relative thereto, said injection head having a passageway extending from one side to the other thereof, movable plastic supply means including a cylinder and ram for compression of the thermoplastic material within the cylinder, said cylinder having a nozzle arranged for abutment with said injection head and having an orifice for connecting said cylinder with one end of said passageway, power means arranged to force said cylinder nozzle against said injection head, an injection nozzle at all times carried by said injection head and interposed between it and said mold and adapted for abutment with said mold, said injection nozzle having a passageway extending between the other end of the first mentioned passageway and said entrance orifice, a movable closure rod extending through said injection head and injection nozzle and adapted to seat against said entrance orifice to prevent communication between said entrance orifice and nozzle passageway, and actuating mechanism adapted to unseat said closure rod drawing a terminal portion of the ram compressing movement.

5. In an injection molding machine according to claim 4, wherein a first timer mechanism is arranged to control compression movement of said ram, and a second timer mechanism is arranged to control the operation of said actuating mechanism so that the latter will function during a terminal portion of the ram compressing movement.

6. In an injection molding machine for thermoplastic materials, the combination comprising a stationary platen, a split mold one part of which is removably affixed to said platen on one side thereof and has an entrance orifice, an injection head arranged on the other side of said platen and slidably supported for movement relative thereto, said injection head being formed to provide a passageway extending from one side to the other, a hopper assembly movably arranged relative to said platen, power means interposed between said hopper assembly and platen and adapted for causing movement of said hopper assembly, said hopper assembly including a cylinder and a ram for compression of the thermoplastic material within said cylinder, said cylinder having a nozzle arranged for abutment with said injection head and having an orifice for connecting said cylinder with said passageway, an injection nozzle at all times supported upon said injection head and adapted for abutment with said mold, said injection nozzle being formed to provide a passageway extending between the first mentioned passageway and said entrance orifice, and a movable closure rod arranged to extend through said injection head and injection nozzle and adapted to seat against said entrance orifice to prevent communication between said nozzle passageway and said entrance orifice.

References Cited in the file of this patent

UNITED STATES PATENTS

| | | |
|---|---|---|
| 2,318,031 | Tucker | May 4, 1943 |
| 2,656,568 | Watkins et al. | Oct. 27, 1953 |
| 2,668,325 | Goodwin | Feb. 9, 1954 |
| 2,773,284 | Kelly | Dec. 11, 1956 |
| 2,865,050 | Strauss | Dec. 23, 1958 |
| 2,871,517 | Allard | Feb. 3, 1959 |
| 2,912,719 | Gilmore | Nov. 17, 1959 |

FOREIGN PATENTS

| | | |
|---|---|---|
| 571,071 | Great Britain | Aug. 3, 1945 |
| 912,194 | France | Apr. 23, 1946 |
| 962,727 | France | Dec. 12, 1949 |